(12) United States Patent
Takeuchi (10) Patent No.: US 7,209,307 B2
(45) Date of Patent: Apr. 24, 2007

(54) VARIABLE READ OUTPUT IMPEDANCE CONTROL CIRCUIT FOR A MAGNETIC MEDIA STORAGE SYSTEM

(75) Inventor: Hiroshi Takeuchi, Sunnyvale, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 159 days.

(21) Appl. No.: 10/402,063

(22) Filed: Mar. 27, 2003

(65) Prior Publication Data

US 2004/0190176 A1    Sep. 30, 2004

(51) Int. Cl.
*G11B 5/02* (2006.01)
(52) U.S. Cl. .................................... 360/67
(58) Field of Classification Search ............ 360/66–68, 360/46, 55; 330/282, 144; 327/207, 285, 327/272; 326/18; 369/148, 152
See application file for complete search history.

(56) References Cited

U.S. PATENT DOCUMENTS

| | | | | |
|---|---|---|---|---|
| 4,021,749 A | * | 5/1977 | Ishigaki et al. | 330/285 |
| 4,523,238 A | * | 6/1985 | Keel et al. | 360/46 |
| 5,060,089 A | | 10/1991 | Cleveland | 360/51 |
| 5,101,117 A | | 3/1992 | Johnson et al. | 307/269 |
| 5,282,094 A | | 1/1994 | Ngo | 360/46 |
| 5,287,231 A | | 2/1994 | Shier et al. | 360/68 |
| 5,386,328 A | | 1/1995 | Chiou et al. | 360/68 |
| 5,392,172 A | | 2/1995 | Yoshinaga et al. | 360/67 |
| 5,612,828 A | | 3/1997 | Brannon et al. | 360/46 |
| 5,841,603 A | | 11/1998 | Ramalho et al. | 360/68 |
| 5,867,334 A | | 2/1999 | Soichi et al. | 360/68 |

(Continued)

FOREIGN PATENT DOCUMENTS

EP   0 758 782 A2   2/1997

(Continued)

OTHER PUBLICATIONS

Sedra/Smith, "Microelectronics Circuits", 1998, Oxford University Press, 4 th. Edition, pp. 122, 155-157, 163-167, 221-229-233.*

(Continued)

*Primary Examiner*—William Korzuch
*Assistant Examiner*—Daniell L. Negrón
(74) *Attorney, Agent, or Firm*—Haverstock & Owens LLP (57) ABSTRACT

A variable read output impedance control circuit of the present invention includes a variable impedance circuit as the output impedance of a magnetic media storage system. Preferably, the variable impedance circuit includes one or more diodes. The diodes are preferably coupled in series, to provide the output impedance of the magnetic media storage system. The impedance of the diodes is variable based on the amount of bias current that is provided to the diodes. The bias current is provided to the diodes from a current source preferably controlled by a controller circuit. By varying the amount of current provided to the diodes, the impedance of the diodes is adjusted. Accordingly, the read output impedance of the magnetic media storage system is controlled by controlling the bias current provided to the diodes. The range of impedance values provided by the read output impedance control circuit of the present invention is varied by including an appropriate number of diodes within the variable impedance circuit. Preferably, the magnetic media storage system is a hard disk drive.

35 Claims, 7 Drawing Sheets

U.S. PATENT DOCUMENTS

| | | |
|---|---|---|
| 5,956,281 A | 9/1999 | Nakai et al. ................ 365/222 |
| 6,128,146 A | 10/2000 | Ngo ........................... 360/46 |
| 6,211,709 B1 | 4/2001 | Kim ........................... 327/172 |
| 6,246,269 B1 | 6/2001 | Schuler et al. ............. 327/110 |
| 6,256,157 B1 | 7/2001 | Biskeborn et al. ............ 360/31 |
| 6,271,978 B1 | 8/2001 | Block et al. .................. 360/46 |
| 6,519,103 B2* | 2/2003 | Cyrusian .................... 360/46 |
| 6,696,896 B2* | 2/2004 | Kuehlwein et al. ......... 330/305 |
| 6,697,205 B2* | 2/2004 | Cyrusian et al. .............. 360/68 |

FOREIGN PATENT DOCUMENTS

| | | |
|---|---|---|
| JP | 3-187006 | 8/1991 |
| JP | 5-290309 | 11/1993 |

OTHER PUBLICATIONS

Patent Abstracts of Japan, Pub. No. 62183006, Nov. 8, 1987.

* cited by examiner

VARIABLE READ OUTPUT IMPEDANCE CONTROL CIRCUIT FOR A MAGNETIC MEDIA STORAGE SYSTEM

FIELD OF THE INVENTION

The present invention relates to the field of storing data in and obtaining data from a magnetic media storage system. More particularly, the present invention relates to the field of variably controlling the read output impedance of a magnetic media storage system.

BACKGROUND

In magnetic media storage systems for computers, such as hard disk drives, digital data is used to modulate the current in a read/write head coil so that a sequence of corresponding magnetic flux transitions are written onto a magnetic medium in data tracks. To read this recorded data, the read/write head passes over the magnetic medium and transduces the magnetic transitions into pulses of an analog signal that alternates in polarity. The analog signal is provided to and decoded by read channel circuitry to reproduce the digital data.

Figure 1:
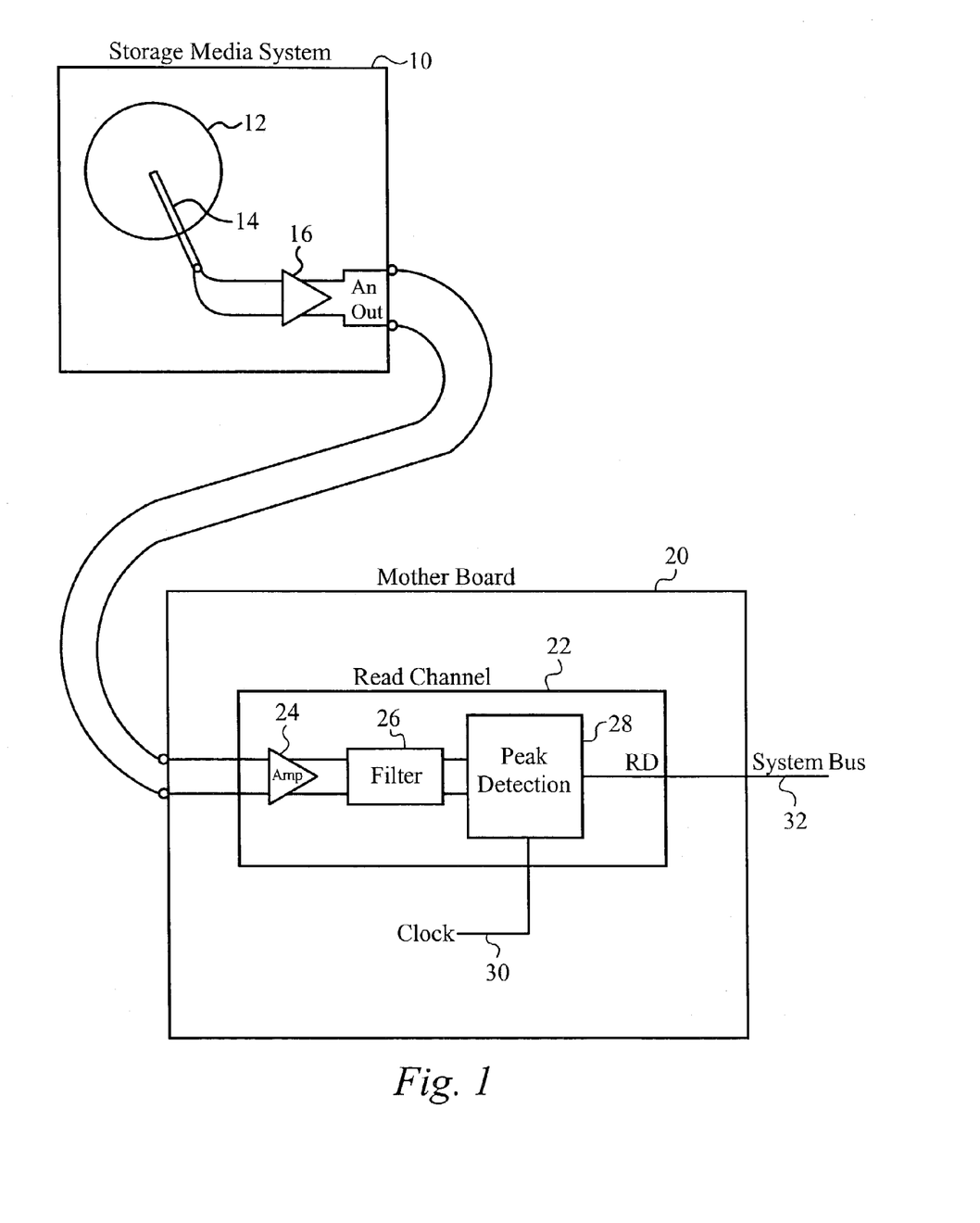
FIG. 1 illustrates a block diagram of a storage media system and a read channel of the prior art.

A block diagram of a storage media system and a read channel is illustrated in FIG. 1. The storage media system 10 includes a storage medium 12, a read/write head 14 and a pre-amplifier 16. The read/write head 14 writes information to and reads information from the magnetic medium 12. While only a single storage medium 12 and read/write head 14 are shown in the block diagram of FIG. 1, it should be apparent to those skilled in the art that the storage media system may include multiple storage media and read/write heads from which data can be written to or read from. Within the storage media system 10, the read/write head 14 is coupled to the pre-amplifier circuit 16 to provide an analog output signal An Out representing the data read from the magnetic medium 12.

The read channel 22 is typically included on the motherboard 20 within the host system. Among other circuits, the read channel 22 includes an amplifier 24, a filter 26 and a peak detection circuit 28. The analog output signal An Out from the pre-amplifier circuit 16 is coupled as an input to the amplifier 24. An output of the amplifier 24 is coupled to the filter 26. An output of the filter 26 is coupled to the peak detection circuit 28. A clock signal 30 from the motherboard is also coupled to the peak detection circuit 28. A read channel output signal RD from the peak detection circuit 28 is coupled to a host system bus 32 in order to provide the digital representation of the analog signal output from the storage media system 10 to other components within the host system. This digital representation represents the data read from the storage medium 12.

Within a hard disk drive, to optimize the performance of the hard disk drive, the necessary read output impedance will depend on the system in which the hard disk drive is included and the configuration of the components within the system. For example, the distance from the hard disk drive to the read channel will be a factor in determining the optimum read output impedance. It is likely that the optimal read output impedance will be different for different systems and different system configurations. For a designer of a hard disk drive, it is therefore necessary to include multiple read output impedances in order to provide alternatives to optimize the performance for the hard disk drive with each specific system and system configuration.

Figure 2:
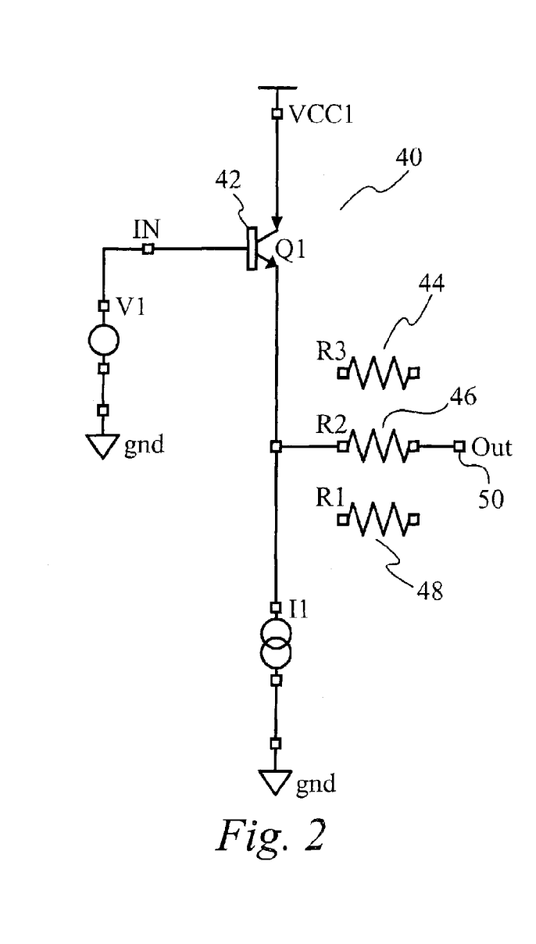
FIG. 2 illustrates a conventional read amplifier output circuit of the prior art.

A conventional read amplifier output circuit is illustrated in FIG. 2. The read amplifier output circuit 40 includes the read amplifier 42, the several resistors 44, 46 and 48, each having a different impedance and the output 50. In order to adjust the output impedance of the read output, metal line traces are routed from the output read amplifier 42 to the appropriate resistor 44, 46 or 48 for the application and then from the appropriate resistor to the output 50. In this manner, the read output impedance can be adjusted by utilizing the appropriate resistor within the read output circuit. By having multiple resistors available on the integrated circuit chip, the read output impedance can be optimized for a particular application or system by routing the traces to include the appropriate resistor in the read output circuit. In the example illustrated in FIG. 2, the traces are routed to include the resistor 46 in the read output circuit.

This method of adjusting the resistance is not ideal because it requires that multiple resistors are included on the integrated circuit chip including the read amplifier output circuit.

SUMMARY OF THE INVENTION

A variable read output impedance control circuit of the present invention includes a variable impedance circuit as the output impedance of a magnetic media storage system. Preferably, the variable impedance circuit includes one or more diodes. The diodes are preferably coupled in series, to provide the output impedance of the magnetic media storage system. The impedance of the diodes is variable based on the amount of bias current that is provided to the diodes. Preferably, the impedance of the diodes is inversely proportional the amount of bias current that is provided to the diodes. The bias current is provided to the diodes from a current source preferably controlled by a controller circuit. By varying the amount of current provided to the diodes, the impedance of the diodes is adjusted. Accordingly, the read output impedance of the magnetic media storage system is controlled by controlling the bias current provided to the diodes. The range of impedance values provided by the read output impedance control circuit of the present invention is varied by including an appropriate number of diodes within the variable impedance circuit. Preferably, the magnetic media storage system is a hard disk drive.

In an aspect of the present invention, a method of transmitting a signal read from a magnetic medium, comprises providing the signal read from the magnetic medium to a variable impedance circuit having an output impedance, controlling the output impedance of the variable impedance circuit and providing an output of the variable impedance circuit as a read output from the magnetic medium. Controlling the output impedance includes providing a bias current to the variable impedance circuit. The variable impedance circuit preferably comprises one or more diodes coupled in series, wherein by varying the bias current to the diodes, the output impedance of the diodes is varied. The output impedance of the diodes is inversely proportional to the bias current provided to the diodes. Each of the diodes preferably includes a bipolar junction transistor. The output impedance of the variable impedance circuit is preferably inversely proportional to the bias current provided to the variable impedance circuit. The magnetic medium is preferably a hard disk drive.

In another aspect of the present invention, a read amplification circuit for transmitting a signal read from a magnetic medium, comprises a means for varying an output impedance configured to receive the signal read from the magnetic medium and provide the signal read from the magnetic medium as an output and a means for controlling coupled to the means for varying for providing a bias current to the means for varying and thereby control the output impedance. The read amplification circuit further comprises a means for amplifying coupled for receiving the signal read from the magnetic medium and providing the signal read from the magnetic medium to the means for varying. The means for varying preferably comprises one or more diodes coupled in series, wherein by varying the bias current to the diodes, the output impedance of the diodes is varied. The output impedance of the diodes is preferably inversely proportional to the bias current provided to the diodes. Each of the diodes preferably includes a bipolar junction transistor. The means for controlling includes a current source coupled to provide the bias current to the means for varying. The output is provided to a read channel. The output impedance is preferably inversely proportional to the bias current provided to the variable impedance circuit. The magnetic medium is preferably a hard disk drive.

In yet another aspect of the present invention, a read amplification circuit for transmitting a signal read from a magnetic medium, comprises a variable impedance circuit configured to receive the signal read from the magnetic medium and provide the signal read from the magnetic medium as an output and a control circuit coupled to the variable impedance circuit to provide a bias current to the variable impedance circuit and thereby control an output impedance of the variable impedance circuit. The read amplification circuit further comprises a read output amplifier circuit coupled to receive the signal read from the magnetic medium and provide the signal read from the magnetic medium to the variable impedance circuit. The variable impedance circuit preferably comprises one or more diodes coupled in series, wherein by varying the bias current to the diodes, the output impedance of the diodes is varied. The output impedance of the diodes is preferably inversely proportional to the bias current provided to the diodes. Each of the diodes preferably includes a bipolar junction transistor. The control circuit includes a current source coupled to provide the bias current to the variable impedance circuit. The output is preferably provided to a read channel. The output impedance of the variable impedance circuit is preferably inversely proportional to the bias current provided to the variable impedance circuit. The magnetic medium is preferably a hard disk drive.

In still yet another aspect of the present invention, a magnetic media storage system for storing and retrieving data, comprises a magnetic medium on which data is stored and from which data is retrieved, a variable impedance circuit coupled to receive the signal read from the magnetic medium and provide the signal read from the magnetic medium as an output and a control circuit coupled to the variable impedance circuit to provide a bias current to the variable impedance circuit and thereby control an output impedance of the variable impedance circuit. The magnetic media storage system further comprises a read output amplifier circuit coupled to receive the signal read from the magnetic medium and provide the signal read from the magnetic medium to the variable impedance circuit. The variable impedance circuit preferably comprises one or more diodes coupled in series, wherein by varying the bias current to the diodes, the output impedance of the diodes is varied. The output impedance of the diodes is preferably inversely proportional to the bias current provided to the diodes. Each of the diodes preferably includes a bipolar junction transistor. The control circuit includes a current source coupled to provide the bias current to the variable impedance circuit. The output is preferably provided to a read channel. The output impedance of the variable impedance circuit is preferably inversely proportional to the bias current provided to the variable impedance circuit. The magnetic media storage system is preferably a hard disk drive.

DETAILED DESCRIPTION OF THE PREFERRED EMBODIMENT

A read output impedance control circuit of the present invention includes a variable impedance circuit as the read amplifier output impedance of a magnetic media storage system. Preferably, the magnetic media storage system is a hard disk drive Preferably, the variable impedance circuit includes one or more diodes, coupled in series, to provide the read amplifier output impedance of the hard disk drive. The impedance of the diodes is variable based on the amount of bias current that is provided to the diodes. Preferably, the impedance of the diodes is inversely proportional to the amount of bias current that is provided to the diodes. The bias current is provided to the diodes from a current source. Preferably, the current source is controlled by a controller circuit. The impedance of the diodes is adjusted by varying the amount of current provided as a bias current to the diodes. Accordingly, the read output impedance of the hard disk drive is controlled by controlling the bias current provided to the diodes. The range of impedance values provided by the read output impedance control circuit of the present invention is varied by including an appropriate number of diodes within the variable impedance circuit.

Figure 3:
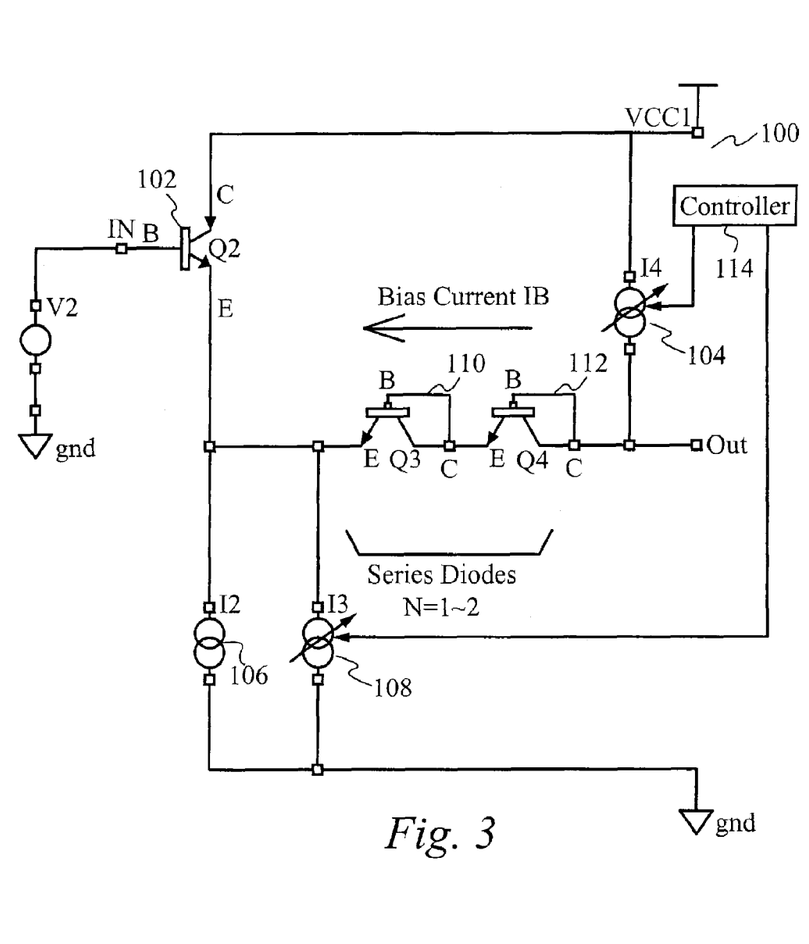
FIG. 3 illustrates a read amplifier output impedance control circuit according to the preferred embodiment of the present invention.

A read output impedance control circuit according to the preferred embodiment of the present invention is illustrated in FIG. 3. The read output impedance control circuit as illustrated in FIG. 3 includes a read preamplifier circuit 102 coupled to receive the output signal read from the magnetic media of the hard disk drive. Preferably, the read preamplifier circuit 102 is comprised of a bipolar junction transistor having a base, a collector and an emitter. The base of the transistor 102 is coupled to receive the output signal read from the magnetic media of the hard disk drive. The collector of the transistor 102 is coupled to the voltage source VCC. The emitter of the transistor 102 is coupled to a first terminal of a current source 106, to a first terminal of a current source 108 and to emitter of a bipolar junction transistor 110.

The read output impedance control circuit as illustrated in FIG. 3, also includes a current source 104 including a first terminal and a second terminal. The first terminal of the current source 104 is coupled to the voltage source VCC. A second terminal of the current source 104 is coupled to a collector and a base of a bipolar junction transistor 112 forming the output of the read output impedance control circuit of the present invention. An emitter of the transistor 112 is coupled to a collector and a base of the transistor 110. The emitter of the transistor 110 is coupled to the emitter of the transistor 102, to a first terminal of a current source 106 and to a first terminal of a current source 108. A second terminal of the current source 106 and a second terminal of the current source 108 are both coupled to ground.

The read output impedance control circuit as illustrated in FIG. 3, also includes a controller 114. The controller 114 is coupled to control the current source 104 and the current source 108.

Both of the transistors 110 and 112 are coupled in a diode configuration and provide the output impedance of the read output circuit of the present invention. The controller 114 is programmed or set by a user or system designer to the appropriate values to control the current source 104 and the current source 108 to provide the appropriate bias current to the diodes 110 and 112 for the specific application. The controller 114 controls the bias current that is provided from the current source 104 to the series-coupled diodes 110 and 112. The amount of the bias current provided to the series-coupled diodes 110 and 112 will control the amount of read output impedance of the diodes 110 and 112. Accordingly, the read output impedance of the diodes 110 and 112 is adjusted or varied by adjusting or varying the bias current provided to the diodes 110 and 112.

Figure 4:
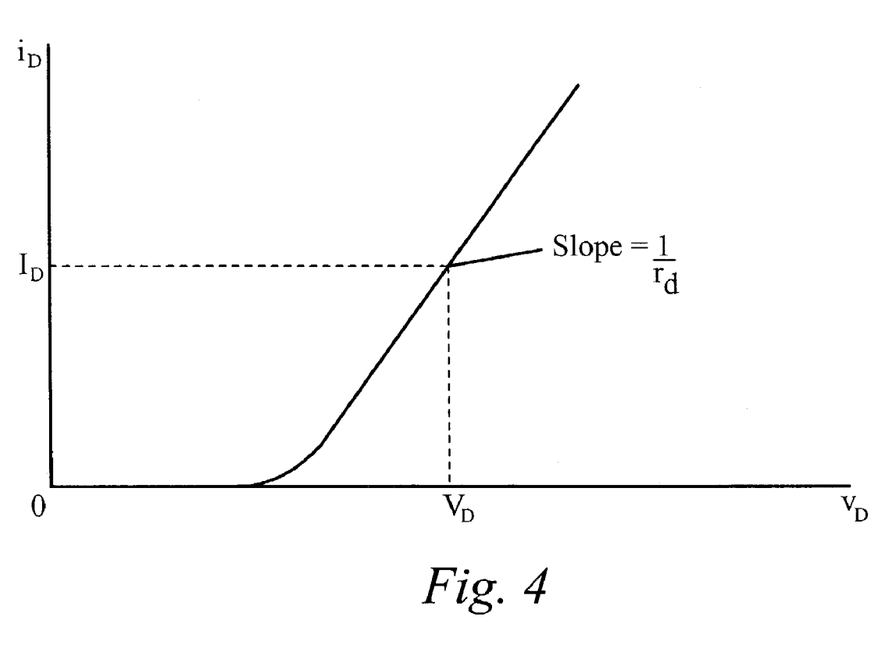
FIG. 4 illustrates a graph of the current versus voltage small-signal response of the diodes within the read output impedance control circuit of the present invention.

A graph of the current versus voltage small-signal response of the diodes 110 and 112 is illustrated in FIG. 4. As can be seen from the graph of FIG. 4, as the bias current through a diode increases, the voltage across the diode also increases. This relationship continues until the voltage across the diode reaches the break-down threshold. The resistance of the diode before the voltage across the diode reaches the break-down threshold is equal to $$r_d = (n^* V_T)/I_D \qquad \text{Equation (1)}$$

In this equation, the value n is a diode constant which depends on the material and the physical structure of the diode. The value $V_T$ is a voltage constant which is referred to as the thermal voltage. From equation (1) it is evident that the resistance value $r_d$ is inversely proportional to the bias current $I_D$. Accordingly, by varying the bias current $I_D$ through the diodes 110 and 112, the impedance across the diodes is varied.

By placing the diodes 110 and 112 in series, the impedance across each of the diodes 110 and 112 is added together to form the read output impedance for the circuit. Accordingly, while preferably, the two diodes 110 and 112 are utilized within the variable impedance circuit of the read output impedance control circuit of the present invention, it should be apparent to those skilled in the art that any appropriate number of diodes can be used in order to obtain the appropriate range of available impedance values.

The controller 114 controls the bias current flowing through the current source 104 and the current source 108, and provided to the diodes 110 and 112. In the preferred embodiment of the read output impedance control circuit of the present invention, the controller 114 has two input control bits RO1 and RO2. In response to the values of the input control bits RO1 and RO2, the controller 114 will cause the current source 104 and the current source 108 to provide a corresponding bias current to the diodes 110 and 112. The table below illustrates the preferred relationship between the values of the input control bits RO1 and RO2 and the corresponding read output impedance of the combination of the diodes 110 and 112:

TABLE I

| Read Output Impedance | | |
|---|---|---|
| RO1 | RO2 | Output Impedance (ohm) |
| L | L | 76.1 |
| L | H | 83.7 |
| H | L | 98.5 |
| H | H | 141.3 |

As shown in Table I, utilizing the two diodes 110 and 112, the output impedance of the preferred embodiment can be adjusted between 76.1 ohm and 141.3 ohm, depending on the values of the input control bits RO1 and RO2. If both of the input control bits RO1 and RO2 are at a logical low voltage level, then the output impedance will be equal to 76.1 ohm. If the input control bit RO1 is at a logical low voltage level and the input control bit RO2 is at a logical high voltage level, then the output impedance will be equal to 83.7 ohm. If the input control bit RO1 is at a logical high voltage level and the input control bit RO2 is at a logical low voltage level, then the output impedance will be equal to 98.5 ohm. If both of the input control bits RO1 and RO2 are at a logical high voltage level, then the output impedance will be equal to 141.3. ohm.

Figure 5:
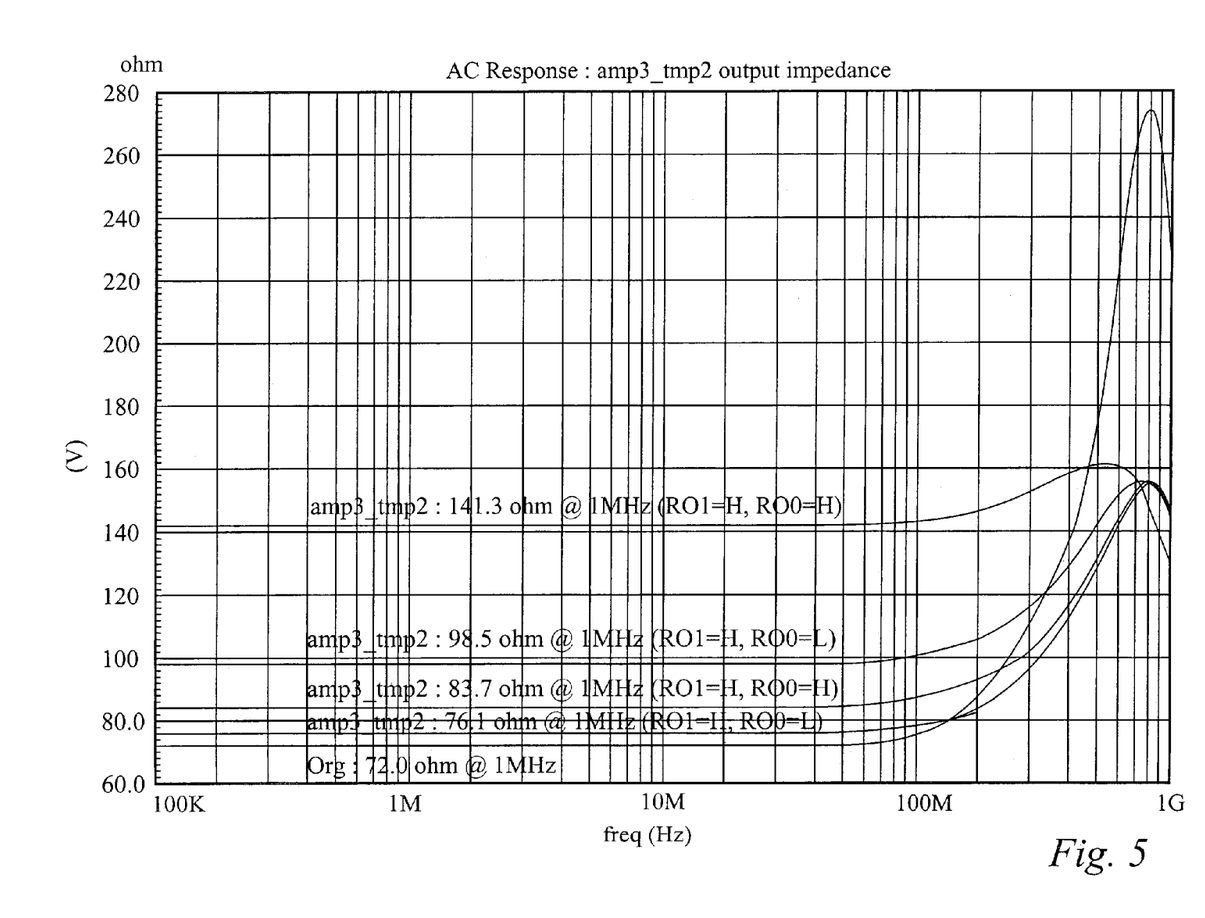
FIG. 5 illustrates a waveform representing the output impedance of the read output impedance control circuit of the preferred embodiment of the present invention.

FIG. 5 illustrates a waveform representing the output impedance of the read output impedance control circuit of the preferred embodiment of the present invention, as illustrated in FIG. 3, over a range of frequencies. As is shown in the waveform of FIG. 5, the frequency response of the read output impedance control circuit of the preferred embodiment is constant to a frequency of 100 MHz for each of the impedances of Table I.

Figure 6:
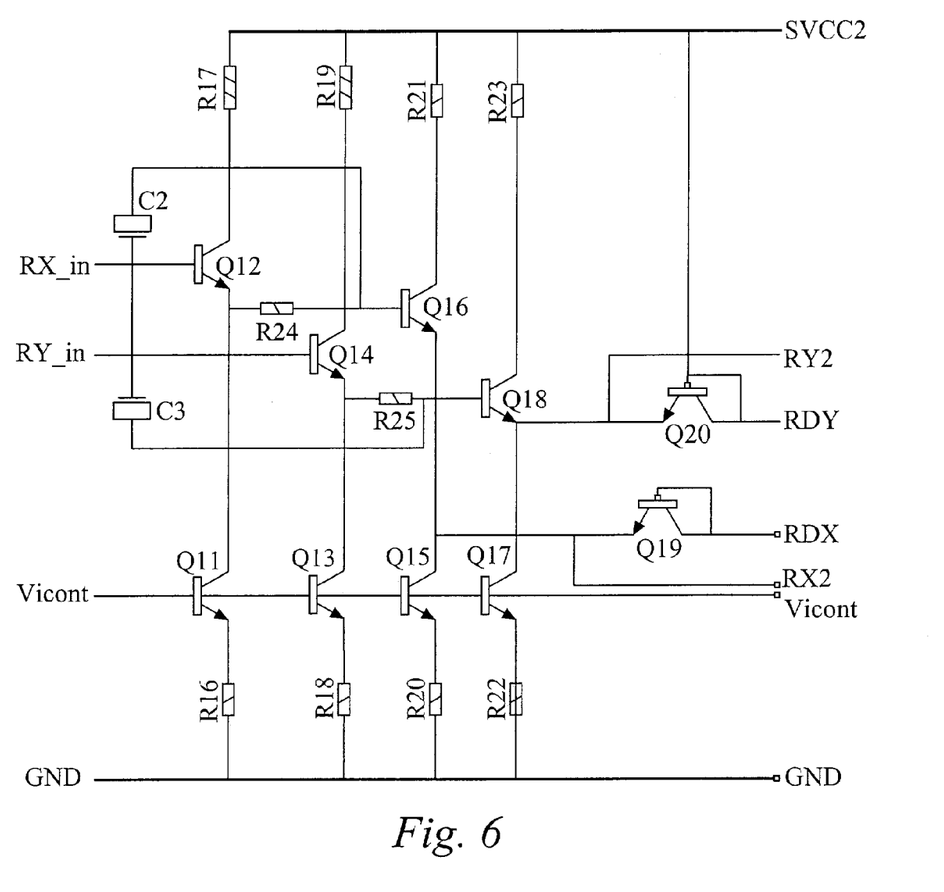
FIG. 6 illustrates a detailed circuit schematic of the preferred embodiment of the read output impedance control circuit of the present invention.
Figure 7A:
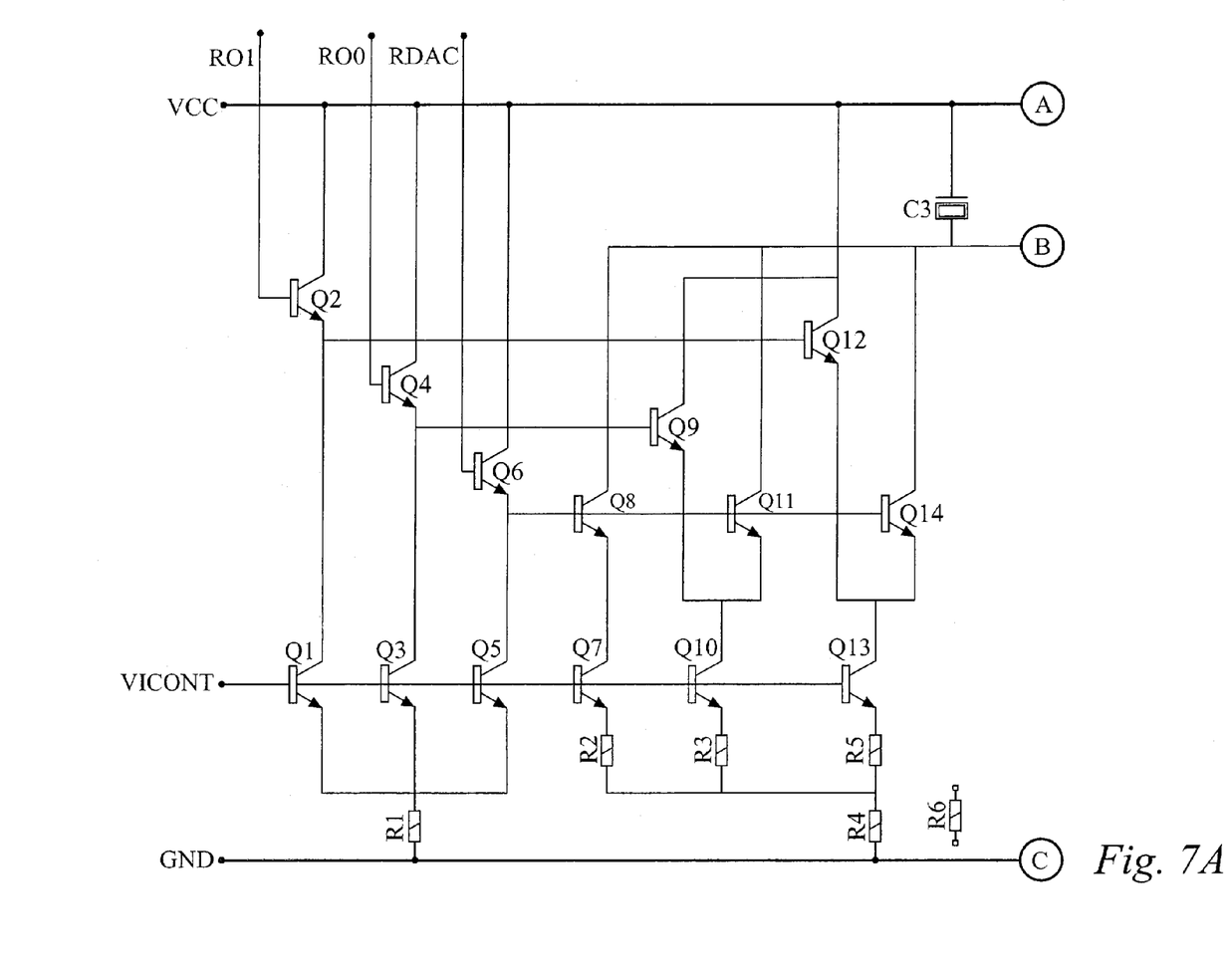
FIG. 7 illustrates a detailed circuit schematic of the preferred embodiment of the current source control circuit of the present invention.
Figure 7B:
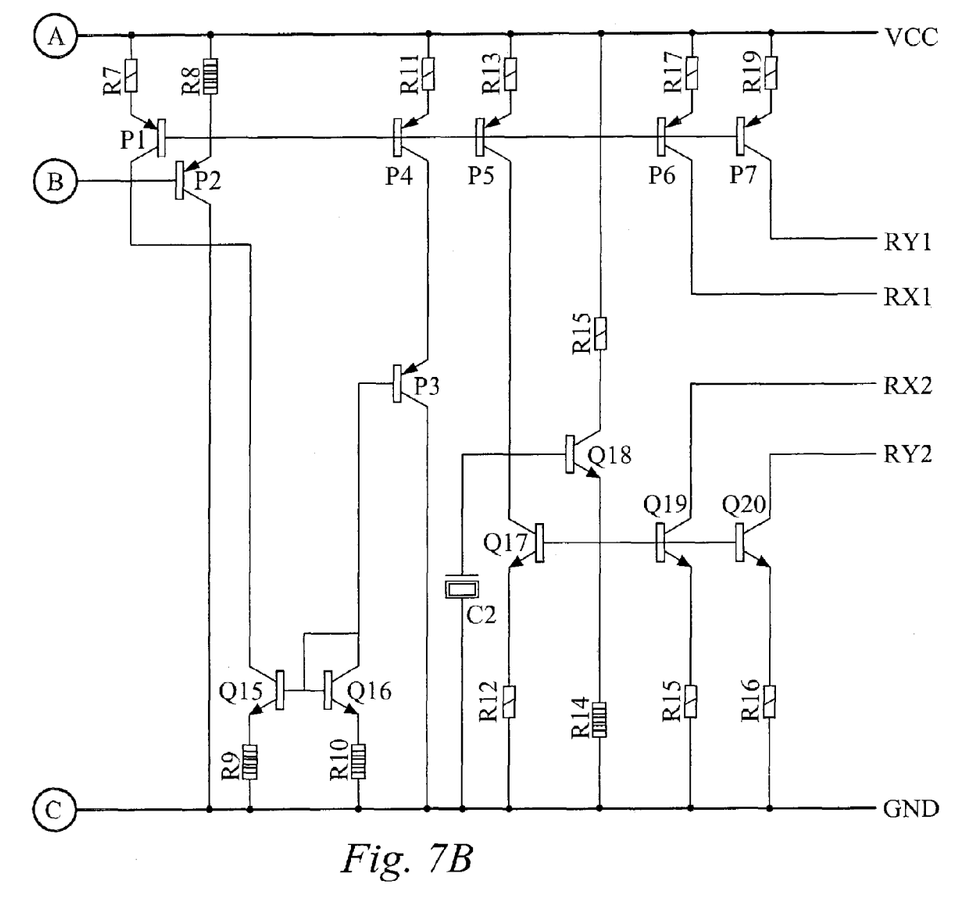

A detailed circuit schematic of the preferred embodiment of the read output impedance control circuit of the present invention is illustrated in FIG. 6. A detailed circuit schematic of the preferred embodiment of the current source control circuit of the present invention is illustrated in FIG. 7. Within the read output impedance control circuit of FIG. 6, the current source control circuit of FIG. 7 preferably controls the amount of bias current provided to the diodes, in order to control the impedance across the diodes and thereby control the read output impedance of the circuit.

As described herein, the read output impedance control circuit of the present invention utilizes one or more diodes, preferably in series, to provide the read amplifier output impedance of the hard disk drive. A controller circuit is utilized to control the amount of bias current provided from a current source to the diodes. The controller circuit is programmed or set by a user or system designer to the appropriate values to provide the appropriate bias current to the diodes for the specific application. The bias current from the current source is then provided to the diodes and generates the appropriate impedance across the diodes. By varying the bias current provided to the diodes, the value of the output impedance of the hard disk drive is varied. Also, by including more or less diodes in the read output impedance control circuit of the present invention, an appropriate range of impedance values is achieved.

While the preferred embodiment of the present invention has been illustrated and described as an integrated circuit using bipolar transistors, it will be apparent to a person of ordinary skill in the art that the circuit of the present invention may be implemented using another device technology, including but not limited to CMOS, MOS, discrete components and ECL. It will also be apparent to those skilled in the art that different logic circuit configurations could be substituted for the logic circuit described above to perform the functions of the preferred embodiment.

The above figures are merely intended to illustrate a particular implementation of the present invention, but are not intended to limit the scope of the present invention to this particular implementation.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

I claim:

1. A method of transmitting a signal read from a magnetic medium, comprising:
    providing the signal read from the magnetic medium to a variable impedance circuit having an output impedance;
    controlling the output impedance of the variable impedance circuit, wherein
    controlling the output impedance includes providing a bias current to the variable impedance circuit; and
    providing an output of the variable impedance circuit as a read output from the magnetic medium,
    wherein the variable impedance circuit comprises one or more diodes coupled in series, wherein by varying the bias current to the diodes, the output impedance of the diodes is varied.

2. The method as claimed in claim 1 wherein the output impedance of the diodes is inversely proportional to the bias current provided to the diodes.

3. The method as claimed in claim 1 wherein the or each diode is a junction in a bipolar junction transistor.

4. The method as claimed in claim 1 wherein the output impedance of the variable impedance circuit is inversely proportional to the bias current provided to the variable impedance circuit.

5. The method as claimed in claim 1 wherein the magnetic medium is a hard disk drive.

6. A read amplification circuit for transmitting a signal read from a magnetic medium, comprising:
    means for varying an output impedance, the means for varying being configured to receive the signal read from the magnetic medium and to provide the signal read from the magnetic medium as an output; and
    means for controlling coupled to the means for varying, wherein the means for controlling controls the output impedance by providing a bias current to the means for varying, wherein the means for varying comprises one or more diodes coupled in series, wherein by varying the bias current to the diodes, the output impedance of the diodes is varied.

7. The read amplification circuit as claimed in claim 6 further comprising a means for amplifying coupled to receive the signal read from the magnetic medium and to provide the signal read from the magnetic medium to the means for varying.

8. The read amplification circuit as claimed in claim 6 wherein the output impedance of the diodes is inversely proportional to the bias current provided to the diodes.

9. The read amplification circuit as claimed in claim 6 wherein the or each diode is a junction in a bipolar junction transistor.

10. The read amplification circuit as claimed in claim 6 wherein the means for controlling includes a current source coupled to provide the bias current to the means for varying.

11. The read amplification circuit as claimed in claim 6 wherein the output is provided to a read channel.

12. The read amplification circuit as claimed in claim 6 wherein the output impedance is inversely proportional to the bias current provided to the variable impedance circuit.

13. The read amplification circuit as claimed in claim 6 wherein the magnetic medium is a hard disk drive.

14. A read amplification circuit for transmitting a signal read from a magnetic medium, comprising:
    a variable impedance circuit configured to receive the signal read from the magnetic medium and provide the signal read from the magnetic medium as an output; and
    a control circuit coupled to the variable impedance circuit to provide a bias current to the variable impedance circuit and thereby control an output impedance of the variable impedance circuit, wherein the variable impedance circuit comprises one or more diodes coupled in series, wherein by varying the bias current to the diodes, the output impedance of the diodes is varied.

15. The read amplification circuit as claimed in claim 14 further comprising a read output amplifier circuit coupled to receive the signal read from the magnetic medium and to provide the signal read from the magnetic medium to the variable impedance circuit.

16. The read amplification circuit as claimed in claim 14 wherein the output impedance of the diodes is inversely proportional to the bias current provided to the diodes.

17. The read amplification circuit as claimed in claim 14 wherein the or each diode is a junction in a bipolar junction transistor.

18. The read amplification circuit as claimed in claim 14 wherein the control circuit includes a current source coupled to provide the bias current to the variable impedance circuit.

19. The read amplification circuit as claimed in claim 14 wherein the output is provided to a read channel.

20. The read amplification circuit as claimed in claim 14 wherein the output impedance of the variable impedance circuit is inversely proportional to the bias current provided to the variable impedance circuit.

21. The read amplification circuit as claimed in claim 14 wherein the magnetic medium is a hard disk drive.

22. A magnetic media storage system for storing and retrieving data, comprising:
    a magnetic medium on which data is stored and from which data is retrieved; a variable impedance circuit coupled to receive a signal read from the magnetic medium and to provide the signal read from the magnetic medium as an output; and
    a control circuit coupled to the variable impedance circuit, wherein the control circuit controls an output impedance of the variable impedance circuit by providing a bias current to the variable impedance circuit, wherein the variable impedance circuit comprises one or more diodes coupled in series, wherein by varying the bias current to the diodes, the output impedance of the diodes is varied.

23. The magnetic media storage system as claimed in claim 22 further comprising a read output amplifier circuit coupled to receive the signal read from the magnetic medium and provide the signal read from the magnetic medium to the variable impedance circuit.

24. The magnetic media storage system as claimed in claim 22 wherein the output impedance of the diodes is inversely proportional to the bias current provided to the diodes.

25. The magnetic media storage system as claimed in claim 22 wherein the or each diode is a junction in a bipolar junction transistor.

26. The magnetic media storage system as claimed in claim 22 wherein the control circuit includes a current source coupled to provide the bias current to the variable impedance circuit.

27. The magnetic media storage system as claimed in claim 22 wherein the output is provided to a read channel.

28. The magnetic media storage system as claimed in claim 22 wherein the output impedance of the variable impedance circuit is inversely proportional to the bias current provided to the variable impedance circuit.

29. The magnetic media storage system as claimed in claim 22 wherein the magnetic media storage system is a hard disk drive.

30. A method comprising:
reading data from a magnetic storage medium;
outputting the data via a variable impedance circuit;
establishing a first output impedance of the variable impedance circuit by providing a first bias current at a diode function in the variable impedance circuit if outputting the data to a read channel requiring the first output impedance; and
establishing a second output impedance of the variable impedance circuit by providing a second bias current at the diode function in the variable impedance circuit if outputting the data to a read channel requiring the second output impedance.

31. The method of claim 30, wherein the diode function comprises a junction in a transistor.

32. The method of claim 30, wherein the magnetic storage medium comprises a rotating disk.

33. An apparatus comprising:
a magnetic storage medium;
a variable impedance circuit coupled to receive data from the magnetic storage medium; and
a read channel coupled to receive the data from the variable impedance circuit;
wherein a first bias current is applied at a diode function of the variable impedance circuit if the read channel requires the variable impedance circuit to have a first output impedance; and
wherein a second bias current, the second bias current being different from the bias current, is applied at the diode function of the variable impedance circuit if the read channel requires the variable impedance circuit to have a second output impedance, the second output impedance being different from the first output impedance.

34. The method of claim 33, wherein the diode function comprises a junction in a transistor.

35. The method of claim 33, wherein the magnetic storage medium comprises a rotating disk.

\* \* \* \* \*